(12) United States Patent
Phillips et al.

(10) Patent No.: US 6,243,377 B1
(45) Date of Patent: Jun. 5, 2001

(54) SYSTEM FOR PROVIDING SIMULTANEOUS VOICE AND DATA TRANSMISSION

(75) Inventors: Brian Harold William Phillips; Pater Anton Jan Kolf; Craig Ian Morley; James McAllister; Mark Gadsby Henson, all of Napier (NZ)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/042,014

(22) Filed: Mar. 13, 1998

(30) Foreign Application Priority Data

Nov. 25, 1997 (NZ) ........................................ 329257

(51) Int. Cl.⁷ ................. H04L 12/66; H04J 1/02
(52) U.S. Cl. .............. 370/354; 370/466; 370/493; 370/522
(58) Field of Search ................... 370/352, 353, 370/354, 466, 468, 477, 493, 522, 523, 524, 401, 409, 463

(56) References Cited

U.S. PATENT DOCUMENTS

| | | | |
|---|---|---|---|
| 5,093,827 | * 3/1992 | Franklin et al. | 370/354 |
| 5,313,467 | 5/1994 | Varghese et al. | 370/94.1 |
| 5,444,703 | 8/1995 | Gagliardi et al. | 370/60.1 |
| 5,610,922 | * 3/1997 | Balatoni | 370/468 |
| 6,034,973 | * 3/2000 | Sanderson | 370/524 |

FOREIGN PATENT DOCUMENTS

| | | |
|---|---|---|
| 428407 | 5/1991 | (EP) . |
| WO97/46073 | 6/1997 | (WO) . |
| WO97/37510 | 10/1997 | (WO) . |
| WO97/47118 | 12/1997 | (WO) . |
| WO97/47127 | 12/1997 | (WO) . |
| WO97/50230 | 12/1997 | (WO) . |

OTHER PUBLICATIONS

"Enhanced Network Performance . . . FAST"—Ericsson PGS2 Digital Pair Gain System publication, Ericsson Communications Limited (folded 2–page brochure).

"Improving Access" Hawke's Bay Herald Tribune, May 30, 1997 (1–page news article).

Dave King, "Napier Team Engineers High–Speed Technology", NZ Infotech Weekly, May 26, 1997 (1–page news article).

"Internet Access Made Faster, Better", Company Profile Ericsson New Zealand, NZ Infotech Weekly, Monday, Dec. 15, 1997 (2–page news article).

* cited by examiner

Primary Examiner—Alpus H. Hsu
Assistant Examiner—Afsar M. Qureshi
(74) Attorney, Agent, or Firm—Burns, Doane, Swecker & Mathis, L.L.P.

(57) ABSTRACT

Methods and apparatus for enabling simultaneous transmission of voice and data signals over a single subscriber line. Signals are time division multiplexed preferably using an ISDN access format such as the Basic Access or Primary Rate formats, but are treated separately at the exchange. Subscriber equipment combines signals from local computer and telephone devices for separation at corresponding exchange equipment. Similarly the exchange equipment combines signals from one or more packet networks and the public telephone network for separation at the subscriber equipment. Data signals are therefore passed by the exchange directly to or from a packet switched network while voice signals are passed directly to or from a telephone switched network. Channels available over the subscriber line are dynamically allocated with telephone signals generally taking preference over data signals.

2 Claims, 4 Drawing Sheets

FIG. 1
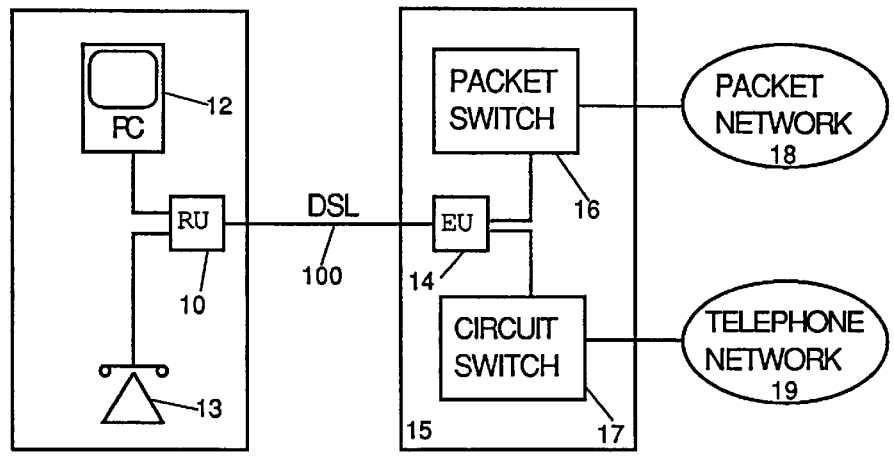
Subcriber    Exchange
FIG. 2
FIG. 3
| O  | +1 | -1 | -3 | +3 | +1 | -3 |
|----|----|----|----|----|----|----|
| 2B | 11 | 01 | 00 | 10 | 11 | 00 |

SYSTEM FOR PROVIDING SIMULTANEOUS VOICE AND DATA TRANSMISSION

FIELD OF THE INVENTION

This invention relates to voice and data communication systems, and in particular but not solely to systems which enable simultaneous voice and data transmission over a single telephone line. More particularly the invention relates to improved methods which enable residential subscribers to telephone and Internet services to access both services simultaneously over a single two wire copper line.

BACKGROUND TO THE INVENTION

The traditional method of Internet access from a subscribers home is by way of a dialled up connection to a modem pool at a server operated by an Internet Service Provider. A connection of this kind is set up in the PSTN (Public Switched Telephone Network) and information is transferred in the form of TCP/IP (Transmission Control Protocol/Internet Protocol) packets. The subscriber typically uses a PC (Personal Computer) connected through their telephone line by way of a modem at speeds of around 33 kb/s or possibly up to 56 kb/s in some cases. However, once the connection is set up the telephone line is generally unable to be used for other incoming or outgoing calls. Further, the connection does not make efficient use of PSTN resources in that Internet sessions are relatively long and bursty in nature.

A wide range of systems have been proposed to enable use of a single telephone line for multiple simultaneous data and/or voice related calls. Subscribers to ISDN (Integrated Services Digital Network) can access the Internet using DSL (Digital Subscriber Line) techniques which provide one, two or more B channels. ISDN basic access provides a 2B+D transmission format in which the B and D channels form a TDM (Time Division Multiplexed) signal and operate at speeds of 64 kb/s and 16 kb/s respectively. If one B channel is in use for Internet access another can carry incoming or outgoing telephone calls simultaneously, and both B channels may be used for Internet data when no telephone call is underway. However, ISDN requires an entirely new network solution, and for Internet access generally makes the same relatively inefficient use of PSTN resources as the traditional modem connection.

There is rapid development of other DSL access technology, such as ADSL (Asymmetric Digital Subscriber Line) which provides up to about 9 Mb/s downstream to subscribers and up to about 640 kb/s upstream depending on length of the copper pair. VDSL (Very high rate DSL) provides up to about 20 Mb/s in both directions. These are more expensive and complex than ISDN in that frequency bands above that of the PSTN are generally used, and are less able to operate effectively over long lines. Still other developments for simultaneous use of a single telephone line include Pairgain systems, DSVD (Digital Simultaneous Voice and Data) modems, and IP modems by which data and voice signals are combined in an IP data stream at the subscribers home. Most of these except the IP modem, also make inefficient use of PSTN circuit switching resources.

SUMMARY OF THE INVENTION

It is an object of the present invention to provide for telephone line communication systems which are improved over existing simultaneous voice and data systems in terms of cost, complexity, availability or efficiency of connection, or which at least provide a useful alternative to existing systems.

Accordingly in one aspect, the invention broadly consists in a method of transmitting voice and data signals simultaneously over a single telephone line between subscriber premises and a communication service provider, wherein the signals occupy two or more channels of a TDM format. The signals are multiplexed or demultiplexed at the service provider premises so that an incoming or outgoing data signals for the subscriber passes through a packet network rather than the PSTN. Although an incoming or outgoing voice signal passes through the PSTN generally in the usual way, the data signal is received directly from or sent directly into the packet network and so avoids the relative inefficiency of the PSTN for such signals. Preferably the TDM format makes use of ISDN basic access channels although the ISDN network solution itself is not used. Preferably the TDM signal is encoded using a compressed transmission format such as 2B1Q.

In another aspect the invention consists in apparatus for the subscriber and service provider premises which enable transmission of TDM signals over the subscriber telephone line, and multiplexing or demultiplexing of outgoing or incoming signals respectively at each premises. At the exchange premises connections are made such that voice signals pass through the circuit switched public telephone network in the usual way while data signals pass through a packet switched network and avoid the telephone network. Remote terminal equipment is provided for installation at the subscriber premises while corresponding central terminal equipment is installed at the service provider or exchange premises.

Further aspects and advantages of the invention will become apparent from the following description and drawings which are provided by way of example only.

BRIEF DESCRIPTION OF THE DRAWINGS

A preferred embodiment of the invention will be described with reference to the accompanying drawings, of which:

FIG. 1 schematically shows use of the invention to enable simultaneous transmission of voice and data signals over a single telephone line between a subscriber and an exchange;

FIG. 2 illustrates time division multiplexing using ISDN basic access channel format, FIG. 3 illustrates a digital transmission signal using 2B1Q format.

DESCRIPTION OF THE PREFERRED EMBODIMENT

Figure 4:
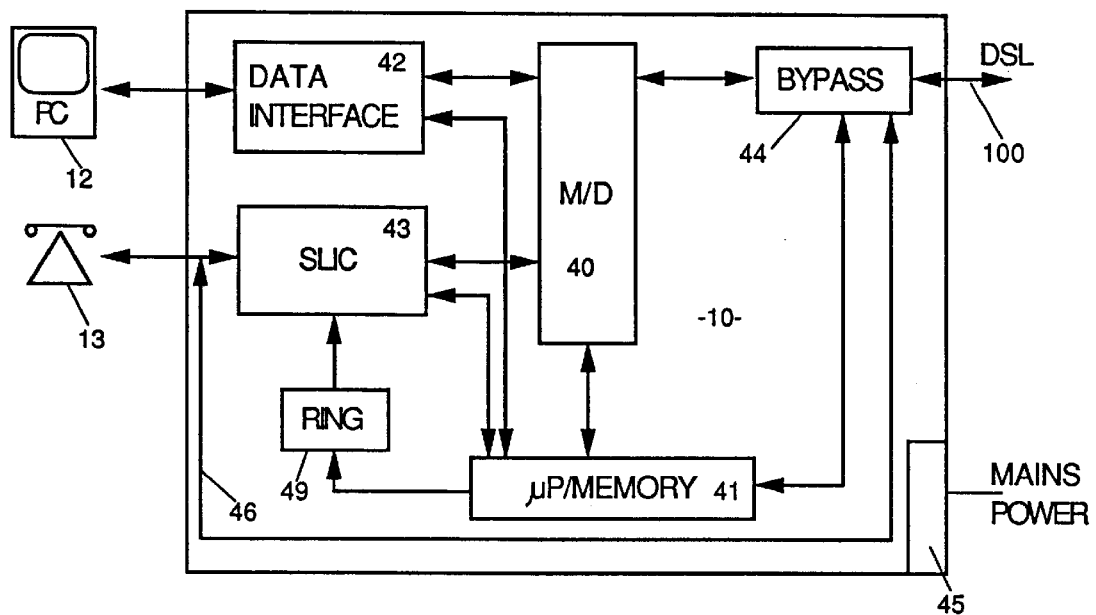
FIG. 4 shows a remote device which may be installed at the subscriber premises in FIG. 1.

Referring to the figures it will be appreciated that the invention need be described in a high-level form only. Most details of the required apparatus will be readily understood by the skilled reader.

FIG. 1 is an overview of a communication system according to the invention, by which a telephone subscriber is able to use an existing copper pair line 100 for simultaneous access to both the telephone and Internet networks. The subscriber installs a remote terminal 10 at his or her premises 11 while a communication service provider installs a corresponding exchange terminal 14 at a local exchange premises or central office 15. Components of the subscriber-based equipment 10 are similar in many ways to those of the provider-based equipment 14 as will described below. Both may be considered as a DCE (Data Communication Equipment) for the purposes of their interaction with other DTE (Data Terminal Equipment) at their respective premises. The subscriber unit 10 and the exchange unit 14 each have two channels, namely a digital data channel and an analogue voice channel. The subscriber thereby connects a home computer device 12 such as a PC and a telephone device 13 such as DTMF telephone to the unit 10. The service provider also thereby connects unit 14 at the exchange premises to a packet switching device 16 such as a router and a circuit switching device 17 such as typically found as part of the Main Distribution Frame structure at an exchange. The router 16 in turn acts a gateway to one or more wide or local area packet networks 18 such as the Internet or an Intranet. The switch 17 passes telephone voice-grade signals into the PSTN 19.

FIG. 2 indicates how the data and voice channels may be time division multiplexed for transmission over the subscriber line DSL 100. The two channels are preferably multiplexed through an ISDN "U" or basic access interface which carries two B or bearer channels at 64 kb/s each and a D or data channel at 16 kb/s which is normally used for control signalling. A combined 2B+D format signal therefore provides a 144 kb/s stream, and when framing information F is included the actual bit rate of a basic access channel is 192 kb/s. Other formats are also provided under ISDN and may generally be expressed xB+D. In North America for example, a primary rate access format is 23B+D. Use of a more general format enables multiple individual data and or voice channels, or faster combined channels to be made available. In the context of FIG. 1, when the subscriber's telephone device 13 is not in use both bearer channels B1 and B2 of the U interface are available for data transmitted to and from the computer 12. When the telephone goes off hook at the subscriber premises 11, or an incoming ring signal is received at the exchange premises 15, one of the B channels is dynamically allocated to the telephone 13. Flow control signals via the D channel reduce the total capacity of the data channel which is available for the computer from 2B to 1B and 128 kb/s to 64 kb/s. It may be noted that the actual data rate of each B channel is less than the bit rate due to additional processing bits which are required, with the actual data rate being typically 57.6 kb/s.

FIG. 3 indicates how transmission over DSL 100 may be encoded using a compressed digital format such as 2B1Q. According to this preferred format two binary bits "2B" are encoded in one quaternary symbol "1Q". Up to four signal levels can therefore occur with each level defining the code for two bits of a multiplexed signal being transmitted between the subscriber premises 11 and the exchange premises 15. This figure is simply an example of a particular digital encoding format, namely the 2B1Q relationship between quaternary symbols and their encoded binary pairs. The previous figure is similarly simply an example of a possible TDM frame format.

FIG. 4 shows components of the subscriber equipment RU 10 indicated in FIG. 1. This equipment includes a multiplexer/demultiplexer circuit M/D 40, preferably an ISDN U interface chip arrangement, under control of a microprocessor 41 with suitable memory. The equipment is mains powered through an input 45. Data signals from the computer device 12 are received by the M/D 40 through data interface 42. The computer device will typically produce and receive asynchronous digital signals through an RS-132 or similar serial port, for example, and the interface 42 converts these to and from a synchronous data flow as required by the M/D 40. Voice-grade signals from the telephone device 13 are received by the M/D 40 through a subscriber line interface circuit 43. The telephone device typically generates and receives analogue signals through a BT socket for example, and the SLIC 43 converts these to and from digital signals as required by the M/D 40. TDM signals passing between the subscriber premises 11 and the exchange 15 are transmitted and received on the subscriber line 100. These signals are preferably in 2B+D and 2B1Q formats as described above. A bypass circuit 44 is able to provide a direct connection 46 between the subscriber line and the output to the telephone device 13 in the event of a failure of equipment 10 or power failure. Each of the data interface 42, SLIC 43 and bypass circuit 44 are under control of the microprocessor 41 which also activates a ring signal generator 49 for the telephone device when an incoming call is detected at the exchange premises 15.

Figure 5:
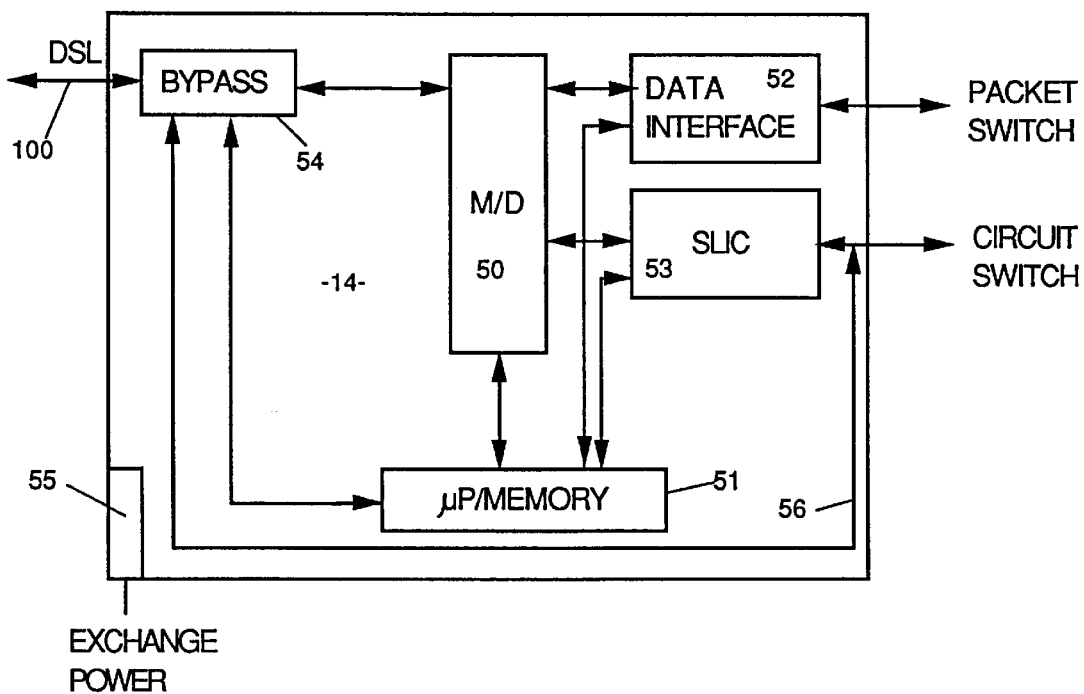
FIG. 5 shows an exchange device which may be installed at the exchange premises in FIG. 1.

FIG. 5 shows exchange equipment EU 14 as indicated generally in FIG. 1. This equipment is similar in many ways to the subscriber equipment 10. A multiplexer/demultiplexer M/D 50, once again preferably an ISDN U interface chip arrangement, is under control of a microprocessor 51 with suitable memory. The equipment is powered from the exchange through an input 55. Data signals from the packet network 18 in FIG. 1 are received by the M/D 50 through interface 52. The router 15 will typically produce and receive asynchronous digital signals by way of an RS-232 or similar serial port, and the interface 52 converts these into synchronous form as required by the M/D 50. Voice grade signals are received from the public telephone network 19 by the M/D 50 through subscriber line interface circuit 53. The telephone switch circuit 17 typically passes analogue signals and these are converted to and from digital form as required by the M/D 50. TDM signals passing between the exchange premises 15 and the subscriber premises 11 are transmitted and received over the subscriber line 100 as described. A bypass circuit 54 provides a direct connection 56 between the subscriber line and the output to the telephone network 19 in the event of failure of either the subscriber or exchange equipment, or a failure in power supply from the exchange. Each of the data interface 52, SLIC 53 and bypass 54 are under control of the microprocessor 51.

Figure 6:
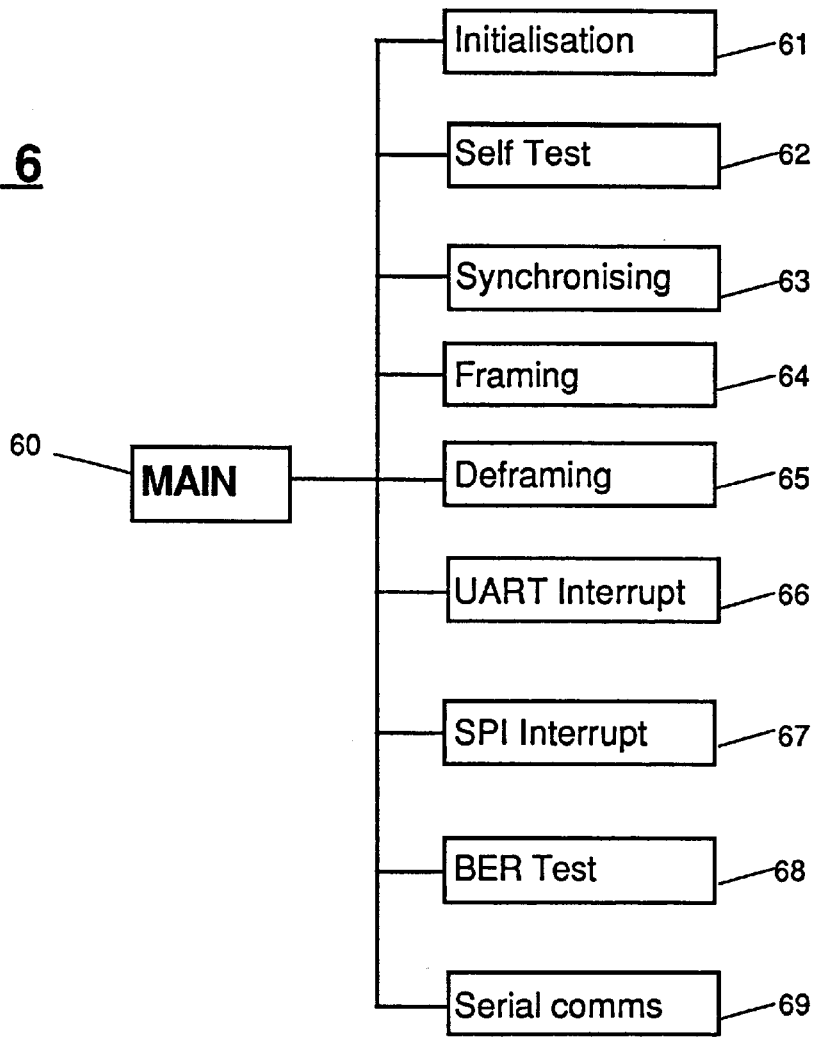
FIG. 6 is a software diagram outlining generally how control over data flow is maintained by microprocessors in the subscriber and exchange equipment.

FIG. 6 outlines software which may be implemented in the microprocessors 41 and 51 in FIGS. 4 and 5 respectively, for controlling data flow between the subscriber equipment 10 and exchange equipment 14. Control is required to manage data rate modification between the generally asynchronous (eg. RS-232) data passing into and out of the equipment via interfaces 42 and 52, and the generally synchronous (eg. U interface) data passing into and out of the equipment onto DSL 100 via the M/Ds 40 and 50. Control is also required to manage variation in the available rates of transmission and reception of data by the data terminal equipment at each premises, generally the computer device 12 and the router 16. The overall rate of data transmission between premises depends on whether one or both of the B channels are available. In operation the microprocessors 41 and 51 cycle continuously through a main program loop 60 such as shown in FIG. 6, following largely repetitive routines and a number of interrupt service routines. Initialisation routine 61 configures input/output pins, watchdog timer, timer modules, interrupts and register variables after reset of the equipment at the particular premises. Self test routine 62 then runs to ensure that all components of the data channel are functioning correctly. The microprocessor then acquires frame synchronisation across the data link between the equipment in synchronising routine 63. The ongoing functions of assembling and analysing frames is then handled by framing and deframing routines 64 and 65 respectively. A UART (Universal Asynchronous Receiver/Transmitter) Interrupt service routine 66 deals with data transfer to the DTE devices 12 and 16 via the RS-232 or similar port. An SPI (Serial Peripheral Interface) Interrupt service routine 67 is responsible for data transfer between the M/D 40 or 50 and the microprocessor 41 or 51. A BER (Bit Error Rate) routine 68 is generally run only in the microprocessor 51. A communication protocol between the microprocessor in each M/D and the respective microprocessors 41 and 51 is enable by a serial communications routine 69.

Figure 7:
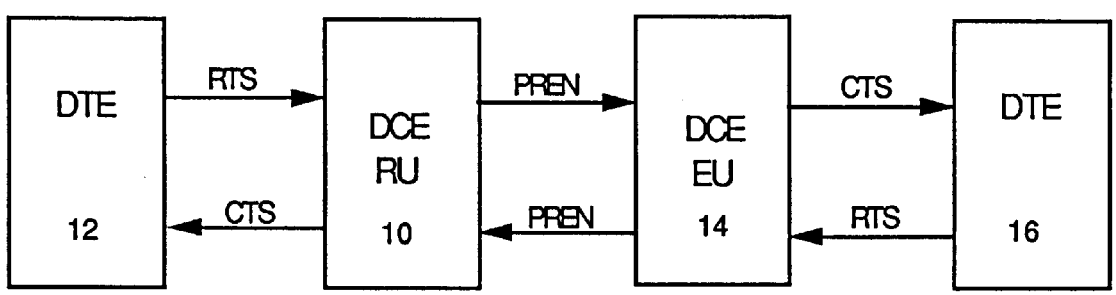
FIG. 7 illustrates data flow control between devices at the subscriber and exchange premises.

FIG. 7 is an overview of data channel flow between the computer device 12 and remote equipment RU 10 at the subscriber premises 11 in FIG. 1, and the router device 16 and exchange equipment EU 14 at the exchange premises 15. The devices 12 and 16 are DTE and the equipment 10 and 14 are DCE. Local flow control between DCE and DTE is preferably hardware based while control between DCE and DCE is generally implemented in software. Hardware control makes use of standard RS-232 signalling by way of I/O pins signalling Ready To Send (RTS) and Clear To Send (CTS) which are readily checked by the microprocessors 41 and 51. Software flow control makes use of a single signal Peer Enable (PREN) which is checked via the status of particular bits in the latest received SPI frame. If DTE 12 cannot process or buffer all of the data arriving from RU 10, the DTE 12 signals RTS which appears as CTS to the DTE 16. A CTS is also signalled by EU 14 to DTE 16 should the RU 10 or EU 14 detect an outgoing or incoming telephone call respectively, requiring fallback to less than the maximum number of TDM channels on DSL 100. Similarly if DTE 16 cannot process or buffer all of the data arriving from EU 14, then DTE 16 signals RTS which appears as CTS to DTE 12. In general, the bit rates of both DTE will be fixed and the RTS/CTS signalling produces an on/off effect in the transmission.

Figure 8:
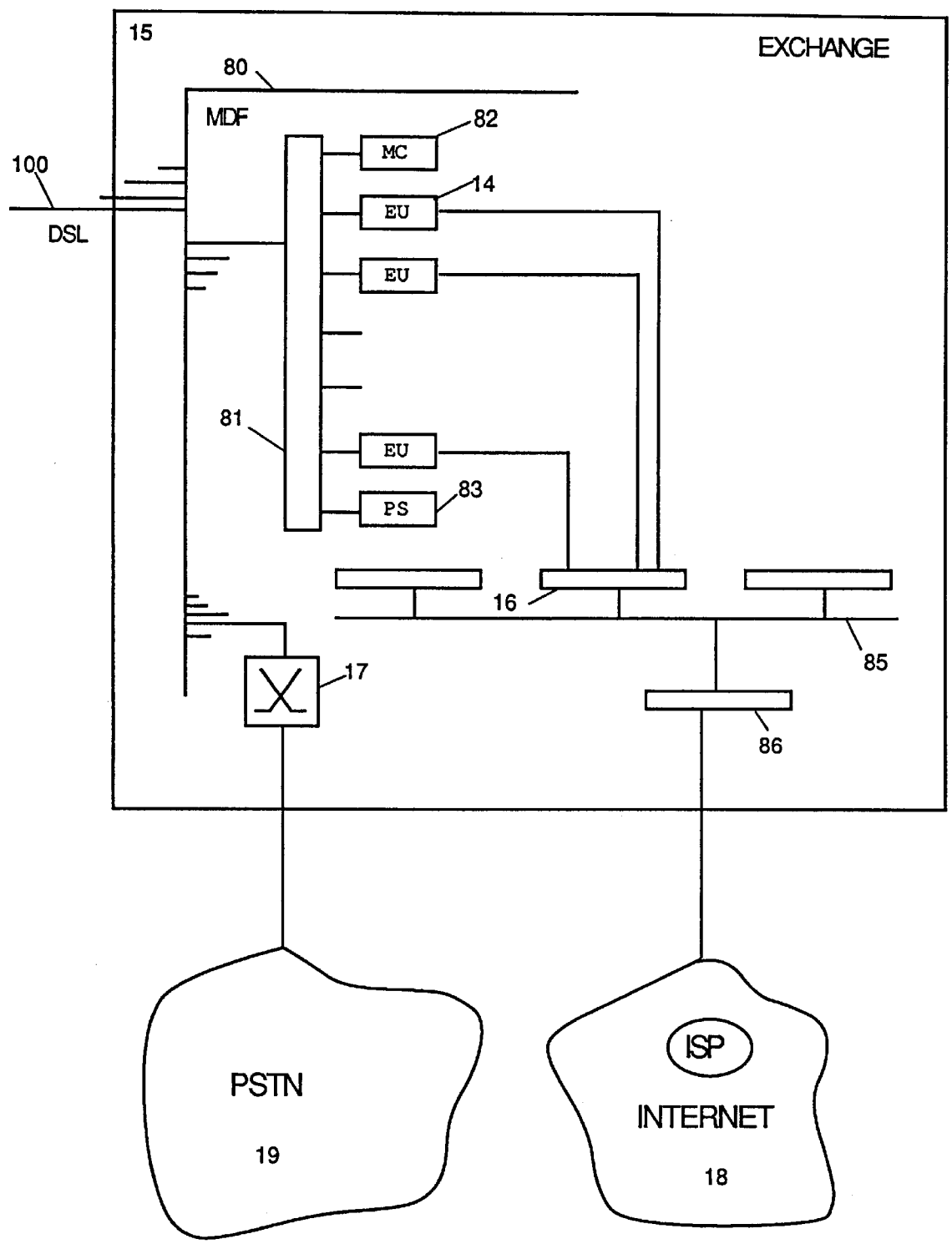
FIG. 8 illustrates multiple subscriber services at an exchange.

FIG. 8 shows by way of highly simplified example, an arrangement of exchange equipment for multiple subscribers, and gives more detail as implied by the arrangements of FIGS. 1 and 5. A main distribution frame structure (MDF) 80 supports cross connections between external lines such as DSL 100 and various items of equipment internal to the exchange premises 15. A backplane shelf 81 connected to the MDF typically supports a member of exchange terminals EU 14 for respective subscribers, perhaps alongside items related to other systems enabling simultaneous voice and data transmission by other subscribers. The shelf has a management controller MC 82 and a power supply PS 83. Each EU 14 has a data connection to the shelf (eg. RS-485) which communicates with the respective MC 82 and enables incoming and outgoing DSL transmissions to the subscriber. Each EU 14 has a plain old telephone (POTS) voice connection to the shelf to carry subscriber telephone calls, and a connection to a router 16 which carries subscriber data, either incoming or outgoing, as processed by the M/D 50. Subscriber telephone calls may be connected to the MDF by one of many circuit switches 17 for transmission to the PSTN 19. Subscriber data transmissions typically pass through an exchange network segment, such as part of an Ethernet system 85, and through a gateway router 86 to an external packet network 18. The packet network is typically part of the Internet, an intranet or an extranet, and may be a fixed permanent or dial-on demand driven network. An Internet service provider ISP is indicated by way of further example.

The invention of a communication system as described above is able to provide two or more channels for data and telephone transmissions between subscriber premises and a telephone exchange or central office. This enables simultaneous access by the subscriber to both data and telephone services, and in particular enables access to the Internet at relatively high data rates without interruption by incoming and outgoing telephone calls at the subscriber premises.

What is claimed is:

1. A method for providing simultaneous telephone and Internet services for subscribers having single telephone line connections between their premises and a communication exchange, comprising:

providing each subscriber with home connection equipment for converting respective outgoing voice and Internet data signals into a single outgoing TDM signal and for converting a respective incoming TDM signal into separate incoming voice and Internet data signals;

providing each subscriber with exchange connection equipment for converting respective outgoing TDM signals into separate outgoing voice and Internet data signals and for converting respective incoming voice and Internet data signals into a single incoming TDM signal;

receiving a plurality of outgoing TDM signals from the subscribers' home connection equipment and converting the signals into a plurality of outgoing voice and Internet data signals using respective exchange connection equipment;

forming groups of the plurality of outgoing Internet data signals from the exchange connection equipment into respective transmission streams in an exchange network system, and passing the transmission streams into a packet network which is external to the exchange;

passing the plurality of outgoing voice signals through a plurality of circuit switches into a telephone network which is external to the exchange;

receiving a plurality of incoming voice signals for the subscribers from the telephone network and a plurality of incoming Internet data signals for the subscribers from the packet network;

converting the incoming voice and Internet data signals for each subscriber into respective incoming TDM signals using the exchange connection equipment; and passing the incoming TDM signals to the subscribers over their respective telephone line connections for conversion into separate voice and Internet data signals by their home connection equipment.

2. A communication system for providing simultaneous telephone and Internet services to subscribers having single telephone line connections between their homes and a communication exchange, comprising:

a plurality of home connection devices for the subscriber connections which convert respective outgoing voice and Internet data signals for each subscriber into an outgoing TDM signal and convert a respective incoming TDM signal into separate incoming voice and Internet data signals;

a plurality of exchange connection devices for the subscriber connections which convert respective outgoing TDM signals from the subscribers into separate outgoing voice and Internet data signals and convert incoming voice and Internet data signals into respective incoming TDM signals;

a plurality of exchange network devices which receive outgoing Internet data from the exchange connection devices for respective groups of subscribers, which receive incoming Internet data signals for the exchange connection devices for the groups of subscribers, and which couple the outgoing and incoming Internet data to and from a packet network external to the exchange; and a plurality of exchange switches which receive outgoing voice signals from the exchange connection devices, which receive incoming voice signals for the exchange connection devices, and which couple the outgoing and incoming voice signals to a telephone network external to the exchange.

* * * * *